United States Patent
Pream et al.

(10) Patent No.: US 9,323,584 B2
(45) Date of Patent: Apr. 26, 2016

(54) LOAD ADAPTIVE DATA RECOVERY PIPELINE

(71) Applicant: Seagate Technology LLC, Cupertino, CA (US)

(72) Inventors: Jeffrey John Pream, Berthoud, CO (US); Bijoy Purushothaman, Longmont, CO (US); Venugopal Rao Garuda, Longmont, CO (US); Ara Patapoutian, Hopkinton, MA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 294 days.

(21) Appl. No.: 14/020,624

(22) Filed: Sep. 6, 2013

(65) Prior Publication Data

US 2015/0074677 A1    Mar. 12, 2015

(51) Int. Cl.
G06F 9/46 (2006.01)
G06F 9/50 (2006.01)

(52) U.S. Cl.
CPC ............ G06F 9/5083 (2013.01); G06F 9/5016 (2013.01); *G06F 2209/507* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 5,381,145 A | 1/1995 | Allen et al. | |
| 6,647,489 B1 * | 11/2003 | Col | G06F 9/30058 712/226 |
| 6,833,831 B2 * | 12/2004 | Emberling | G06F 9/30079 345/506 |
| 6,839,830 B2 * | 1/2005 | Liu | G06F 9/3867 712/200 |
| 8,117,620 B2 | 2/2012 | Raghunath et al. | |
| 8,156,502 B1 | 4/2012 | Blanding | |
| 8,347,194 B2 | 1/2013 | No et al. | |
| 8,438,434 B2 | 5/2013 | Engin | |
| 8,667,377 B1 | 3/2014 | Mazahreh et al. | |
| 2001/0037443 A1 * | 11/2001 | Liu | G06F 9/3867 712/200 |
| 2001/0047501 A1 | 11/2001 | Sindhushayana et al. | |
| 2008/0118229 A1 | 5/2008 | Bliss | |
| 2008/0126812 A1 | 5/2008 | Ahmed et al. | |
| 2009/0328048 A1 | 12/2009 | Khan et al. | |
| 2011/0141889 A1 | 6/2011 | Pang et al. | |
| 2011/0231636 A1 | 9/2011 | Olson et al. | |
| 2013/0007556 A1 | 1/2013 | Patapoutian et al. | |
| 2013/0290953 A1 * | 10/2013 | Li | G06F 9/5066 718/1 |

FOREIGN PATENT DOCUMENTS

EP    0479432    9/1991

OTHER PUBLICATIONS

Guidotti et al. "Millimeter-Wave Main Memory-to-Processor Data Bus", 2010 IEEE, pp. 1280-1287.*

(Continued)

*Primary Examiner* — Van Nguyen
(74) *Attorney, Agent, or Firm* — Hollingsworth Davis, LLC (57) ABSTRACT

A load adaptive pipeline system includes a data recovery pipeline configured to transfer data between a memory and a host. The pipeline includes a plurality of resources, one or more of the plurality of resources in the pipeline have multiple resource components available for allocation. The system includes a pipeline controller configured to assess at least one parameter affecting data transfer through the pipeline. The pipeline controller is configure to allocate resource components to the one or more resources in the pipeline in response to assessment of the at least one data transfer parameter.

18 Claims, 8 Drawing Sheets

(56) References Cited

OTHER PUBLICATIONS

Koutras et al. "Adaptive dynamic memory allocators by estimating application workloads", 2012 IEEE, pp. 252-259.*

Zhang et al. "Integrating Resource Consumption and Allocation for Infrastructure Resources on-Demand", 2010 IEEE, pp. 75-82.*

Mar. 13, 2015, File History for U.S. Appl. No. 14/020,630.

Jha et al., "Adaptive Resource Allocation for Embedded Parallel Applications", IEEE, Aug. 1996, pp. 425-431.

* cited by examiner

LOAD ADAPTIVE DATA RECOVERY PIPELINE

SUMMARY

Some embodiments involve a load adaptive pipeline system that includes a data recovery pipeline configured to transfer data between a memory and a host. The pipeline includes a plurality of resources arranged in series, one or more of the plurality of resources in the pipeline have multiple resource components available for allocation. The system includes a pipeline controller configured to assess at least one parameter affecting data transfer through the pipeline. The pipeline controller is configure to allocate resource components to the one or more resources in the pipeline in response to assessment of the at least one data transfer parameter.

In some embodiments, a system includes a data recovery pipeline configured to execute data transfers including normal data transfers between a memory and a host and special data transfers. The pipeline comprises a plurality of resources arranged in series between the memory and host. One or more of the plurality of resources in the pipeline have multiple resource components available for allocation. The system includes a pipeline controller configured to assess at least one parameter affecting data transfer through the pipeline. The pipeline controller is configured to allocate available resource components to the one or more resources in the pipeline in response to assessment of the data transfer parameter.

Some embodiments are directed to a method of operating a load adaptive pipeline system. The method includes a data communications pipeline that transfers data between a memory and a host. The pipeline includes a plurality of resources coupled in series between a host and a memory. One or more of the resources include multiple resource components available for allocation. At least one parameter affecting data transfer through the pipeline is assessed. One or more resource components of at least one of the plurality of resources in the pipeline are enabled or disabled in response to assessment of the data transfer parameter.

These and other features and aspects of various embodiments may be understood in view of the following detailed discussion and accompanying drawings.

BRIEF DESCRIPTION OF THE DRAWINGS

The same reference numbers may be used to identify like components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

A load adaptive pipeline system can be designed to allocate pipeline resources according to an estimated latency through the pipeline and a target latency. The allocation of pipeline resource components may be performed on the fly to enhance data transfer performance while reducing power consumption. The operation of the load adaptive pipeline is controlled by a pipeline controller that uses quality of data information, data transfer rates of the pipeline, and priority information to allocate pipeline resource components. Non-allocated resource components maybe be deactivated or placed into a reduced power mode to save power.

Figure 1:
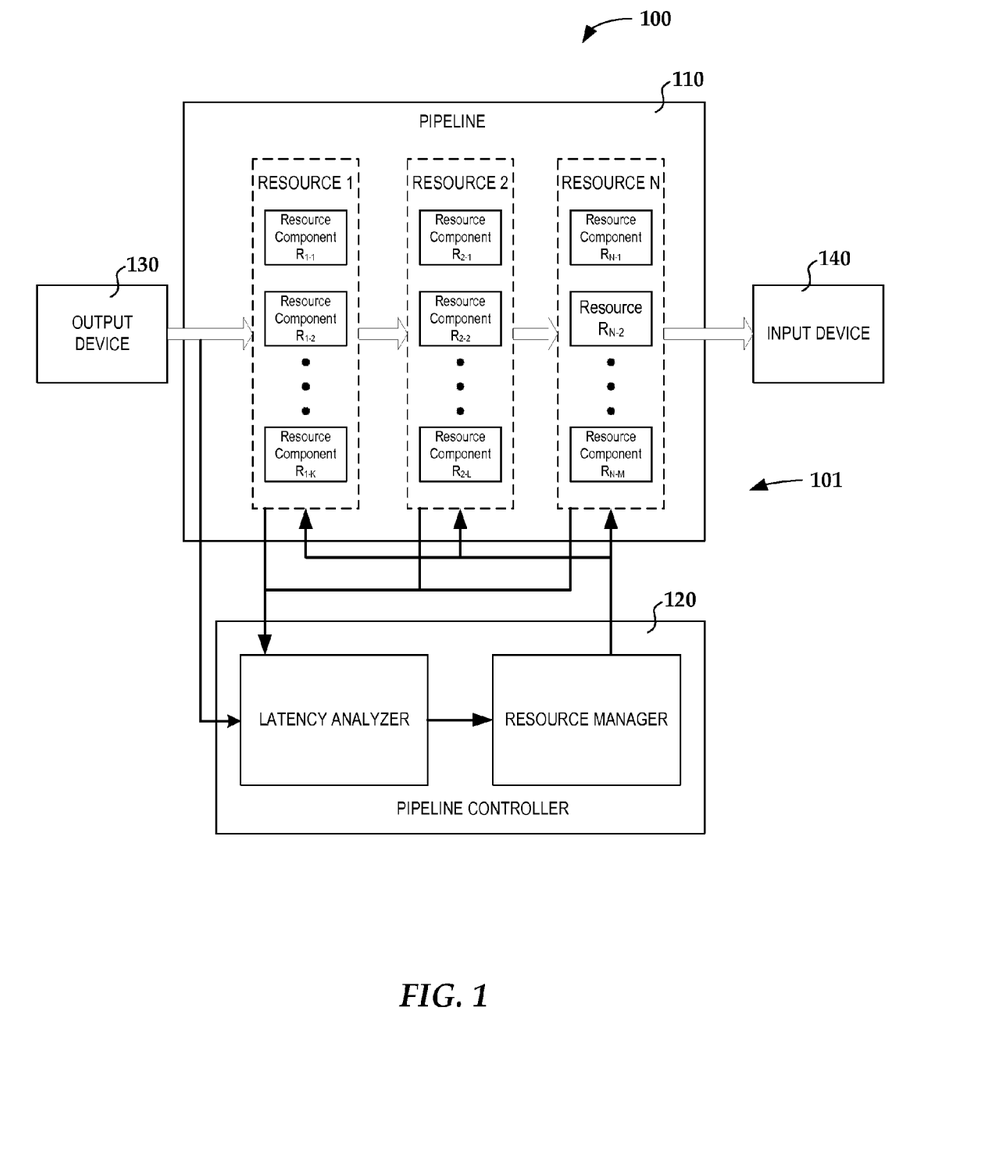
FIG. 1 is a block diagram of a load adaptive data communications pipeline system configured to transfer data between an output device and an input device in accordance with some embodiments.

FIG. 1 is a block diagram of a system 100 that includes a load adaptive pipeline 101 comprising a data transfer pipeline 110 and a load adaptive pipeline controller 120, The pipeline 110 is disposed between an output device 130 and an input device 140 to facilitate data transfers therebetween. Approaches of the load adaptive pipeline are described in terms of a load adaptive data recovery pipeline disposed between an output device (a memory device from which data is read) and an input device (a host system that requests the data). The memory device may include, for example, a magnetic medium, a hybrid memory comprising a magnetic medium and a non-volatile solid state memory such as flash, or a solid state drive, e.g., a flash drive, or other types of memory.

The approaches described herein are also applicable to other pipeline arrangements. For example, the load adaptive pipeline may be arranged to transfer data from a host system to a memory device. In this case, the host would be the input device and the memory device would be the output device. In some configurations, the load adaptive pipeline system 100 may be part of a memory controller.

The pipeline 110 includes a number of stages, each stage associated with a particular pipeline resource. The pipeline resources are shown in FIG. 1 as resources 1, 2, . . . N. In this example, pipeline resources 1, 2, . . . N are coupled in series to transfer the data through the pipeline from the output device 130 to the input device 140. The resources 1, 2, . . . N can include data input buffers, data output buffers, decoders, encoders, for example.

One or more of the resources of the pipeline, e.g., resources 1, 2, . . . N include a number of resource components that are arranged to operate in parallel. As depicted in the block diagram of FIG. 1, resource 1 comprises resource components $R_{1-1}, R_{1-2} \ldots R_{1-K}$; resource component 2 comprises resource components $R_{2-1}, R_{2-2}, \ldots, R_{2-L}$, resource component 3 comprises resource components $R_{3-1}, R_{3-2} \ldots R_{3-M}$. In an embodiment, resource 1 is an input buffer resource comprising K input buffers, resource component 2 is a decoder resource comprising L decoders, and resource N=3 is a output buffer resource comprising M output buffers.

The pipeline controller is configured to allocate the resource components using quality of data information, data transfer rates of the pipeline, and priority information. One or more of the resource components may be active for each resource 1, 2, . . . N in the pipeline depending on the allocation by the pipeline controller. The pipeline controller may enable or disable resource components of each resource to achieve a specified data transfer rate. Disabled resource components can be deactivated or placed into a reduced power mode to conserve power.

As depicted in FIG. 1, the pipeline controller includes a latency analyzer and resource manager. The latency analyzer is configured to determine a total estimated latency from an estimated data transfer time for the data and a current data transfer time of the pipeline or pipeline stages. The estimated data transfer time of the data may be based on data quality factors (such as decode time, bit error rate, code rate, and storage device health, etc.) and also the pending workload at each pipeline stage, for example. The data transfer time of each stage of the pipeline is the time it takes data to transfer through that stage. The total data transfer time of the pipeline is the total of the data transfer times of each pipeline stage.

The resource manager can include a resource allocation controller for each resource in the pipeline. The resource allocation controllers are configured to allocate resource components to achieve a specified data rate based on the total estimated latency. The resource manager may activate or deactivate, enable or disable resource components for one or more resource types. In some implementations, resource components may be placed in various levels of power state, e.g., ready state, light sleep state, deep sleep state, and shut down state. The power state of the resources is based on the current loading of the pipeline resource and the backlog of jobs to be performed by the pipeline. The resource manager maintains a priority sorted list of jobs to be performed by each of the pipeline resources and issues commands to the pipeline stages to perform the jobs.

Figure 2:
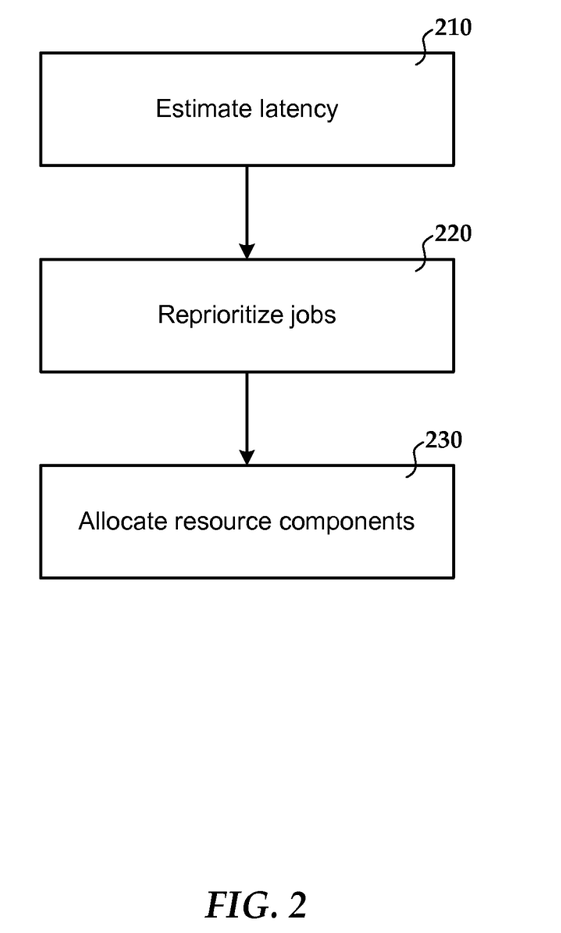
FIG. 2 is a flow diagram illustrating a method of operating a load adaptive pipeline system in accordance with some embodiments.

FIG. 2 is a flow diagram of a process that may be implemented by a load adaptive pipeline system such as the system of FIG. 1. FIG. 2 illustrates a method of implementing a pipeline controller to control resource components of the load adaptive pipeline. The pipeline controller estimates 210 the latency of jobs through the pipeline based on the pipeline stage transfer times and the estimated data transfer time based on the data quality factors. The jobs waiting to traverse the pipeline stages are prioritized 220 based on the latency estimates. Resource components are allocated 230 to meet target latencies of the prioritized jobs.

Figure 3:
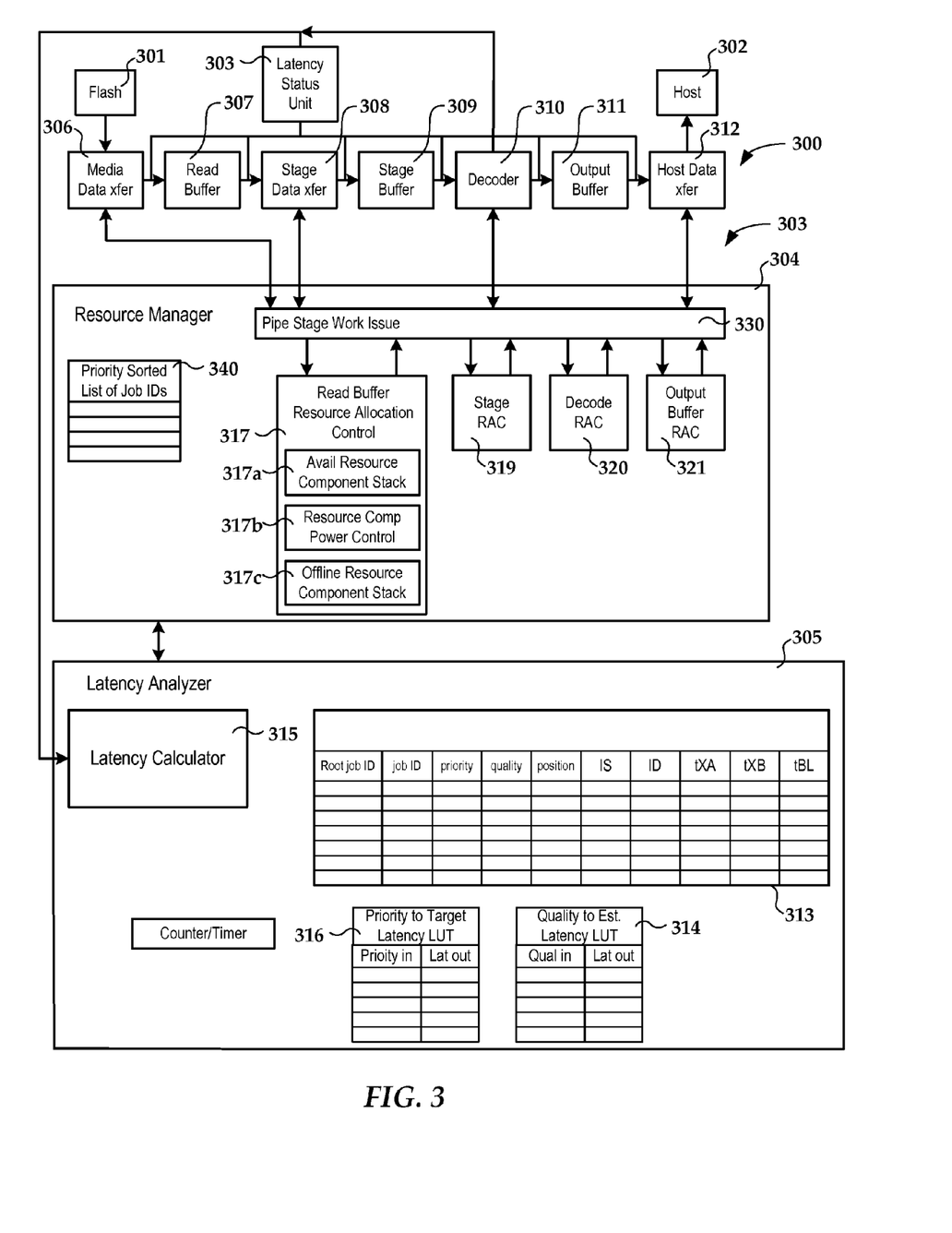
FIG. 3 is a block diagram of a load adaptive data communications pipeline system disposed between a memory and a host processor in accordance with some embodiments.

FIG. 3 is a block diagram of a load adaptive pipeline including data transfer pipeline 300 and load adaptive pipeline controller including latency status unit 303, resource manager 304 and latency analyzer 305. The load adaptive pipeline is arranged to transfer data from a flash memory 301 to a host system 302.

Data transfer pipeline 303 includes data transfer components including a media data transfer component 306 and stage data transfer component 308. The media data transfer component 306 is configured to transfer a sub-job, which is a code word or a subset of code words of the data of a data transfer operation, from the flash to the read buffer resource 307. The stage data transfer component 308 is configured to transfer a sub-job between the read buffer resource 307 and the stage buffer resource 309 that buffers the sub job into a decoder resource 310. The host data transfer component 312 is configured to transfer the sub job from the output buffer resource 311 of the decoder 310 to the host 302. The pipeline includes resources 307, 309, 310, 311. Each of the pipeline resources may include one or more resource components that can be allocated by the pipeline manager. For example, the read buffer resource 307 may include multiple read buffers; the stage buffer resource 309 may include multiple stage buffers, the decoder resource 310 may include multiple decoders, e.g., low density parity check (LDPC) decoders; and the output buffer resource 311 may include multiple output buffers. Two or more resource components of each resource 307, 309, 310, 311 may be arranged to operate in parallel to increase the data transfer rate through the pipeline.

The pipeline 303 includes multiple memory stages and a multi-decoder stage. Each memory stage is made up from multiple cuts of memory that can be independently controlled for buffer operations and power management. The decoder stage is made up from multiple decoders that can be independently controlled for decode operations and power management.

In this example, the data transferred in response to a single host command is referred to as a root job and involves a flash read and data recovery operation. The root job may include multiple code words, and a sub job is created for each code word or subset of code words. The system can request a large payload (root job) that is split into multiple pieces (sub-jobs) to be performed in parallel or serially depending on the resources allocated to the sub-jobs.

The root job includes a quality hint that is shared amount the sub-jobs. The quality hint may be based on a number of parameters such as decode time, bit error rate, code rate, and flash health, etc. and provides an indication of how much time it will take to decode the sub-job. Each root job is associated with a priority. The latency analyzer 305 stores a list of jobs currently in the system and the information 313 associated with each job. The information stored and used by the latency analyzer may include the job identification (Root Job ID), and sub job identification (job ID), the priority (priority), quality hint (quality), position in the job queue (position), time stamp (IS), estimated time to decode and get data ready to transfer to host (ID), time to transfer data to stage buffer (txA), time before data can be transferred to the host (txB), and backlog (tBL), which is the total estimated latency from this job and all jobs ahead of it.

The information for each job allows the latency analyzer to track parameters such as each job's position within the workflow of the system, the length of time the job is expected to take to get through the system, the backlog of jobs within the system that are ahead of a job, and other factors.

The latency analyzer 305 uses the quality hint to obtain an estimated decode operation time. In some implementations, the latency analyzer 305 uses the quality hint to look up the estimated decode operation time from a programmable look up table 314. The pipeline controller includes a latency status unit 303 configured to assess the pipeline stage transfer times and to determine the sum of the pipeline stage transfer times. The information from the latency status unit is passed to the latency calculator 315 which uses the sum of the pipeline stage transfer times and the estimated decode operation time from the look up table 314 to determine the total estimated latency for the sub-job to complete the decode and transfer processes.

The root job command also includes a priority value for the root job. The priority value is used by the latency analyzer 305 to determine a target latency for the root-job and associated sub-jobs. In some implementations, the latency analyzer 315 uses the priority from the host command to a look up a target latency value from a programmable look up table 316. The target latency is the specified or desired amount of time for completion of the decode and transfer process to the host for the sub-job. The total estimated latency and the target latency are used by the resource manager 304 to determine an optimal resource utilization for the load adaptive pipeline.

Sub jobs are prioritized based on their target latency and may be re-prioritized as the sub jobs in the queue complete, as new sub jobs come into the job-queue, and/or if there is risk that a sub job will not meet its target latency. For example, if a sub job is at risk for not meeting its target latency, one or more of the sub jobs in the queue of sub jobs can be re-prioritized based on which sub job has the highest risk of missing its target latency. The evaluation and prioritization process operates within the resource manager 304. If one or more sub jobs are identified that are at risk of missing their latency requirements, then these jobs would get pushed ahead of other sub jobs that have less risk of missing their latency requirement.

The evaluation task is a loop that continually loops through the list of sub jobs updating the latency estimates based on a sub-job's position in the list, the backlog of sub-jobs ahead of the job, and statistics collected from the decoder. The job positions are updated in the job list 313 by the latency analyzer as work issues to various stages and transfer engines in the pipeline through the pipe stage work issue unit 330. As jobs complete a stage in the pipeline, the latency for the completed stage is removed from the backlog.

Decoder statistics such as iteration count and/or bit error count for a job can be fed back into the root job's quality hint to adjust the quality hint closer to the reality of the data quality. The quality feedback may be weighted based on the number of jobs in a root job and how may statistic samples have been accumulated. Latencies may be adjusted based on a code word's physical position within the root job's data set.

The reprioritize function is performed by the latency analyzer and takes recently updated latency numbers and orders them such that the jobs with the highest risk of exceeding the target latency are prioritized over those more likely to complete within the target latency. The priority sorted list of jobs is maintained by the resource manager 304. The resource allocation function looks at the prioritized list 340 and adjusts the number of active resource components for each resource to optimally complete all jobs within their target latency.

Each resource 307, 309, 310, 311 of the pipeline is controlled by a resource allocation controller (RAC) 317, 319, 320, 321. The resource allocation controllers 317, 319, 320, 321 include an available resource component stack, used to track available resource components, and an offline resource stack, used to track resource components that are offline. In FIG. 3, the read buffer RAC available resource component stack 317a, offline resource component stack 317b, and resource power control 317c are shown. Each of the stage RAC, decode RAC, and output buffer RAC also include an available resource component stack, offline resource component stack, and resource component power control which are not shown in FIG. 3.

The available resource components identified in the available resource component stack 317a are not presently active in the pipeline and can become active in a relatively short amount of time. The offline resource components identified in the offline resource component stack 317c are not active and take a longer amount of time to become active than the available resource components. The resource component power control 317b modifies or maintains the power status of each of the resource components as active, available, or offline, for example. The resource component power control is configured to track active and inactive components and to transition the resource components through various power configurations at the recommendation of the resource manager.

The pipeline resource manager is a collection point for resource statistics and controls the resource components for each resource 307, 309, 310, 311 through RACs 317, 319, 320, 321. The resource manager can be implemented as a level of abstraction from the latency analyzer. The resource manager determines which resource components are needed by the pipeline to handle its current workload.

The resource allocation will reduce the number of resource components used until a target latency is exceeded, then adds resource components back to the resource until all target latencies are meet. By looping through these tasks and functions, the number of resource components used for each resource of the load adaptive pipeline is updated to keep the pipeline running with optimal efficiency and power level.

Figure 4:
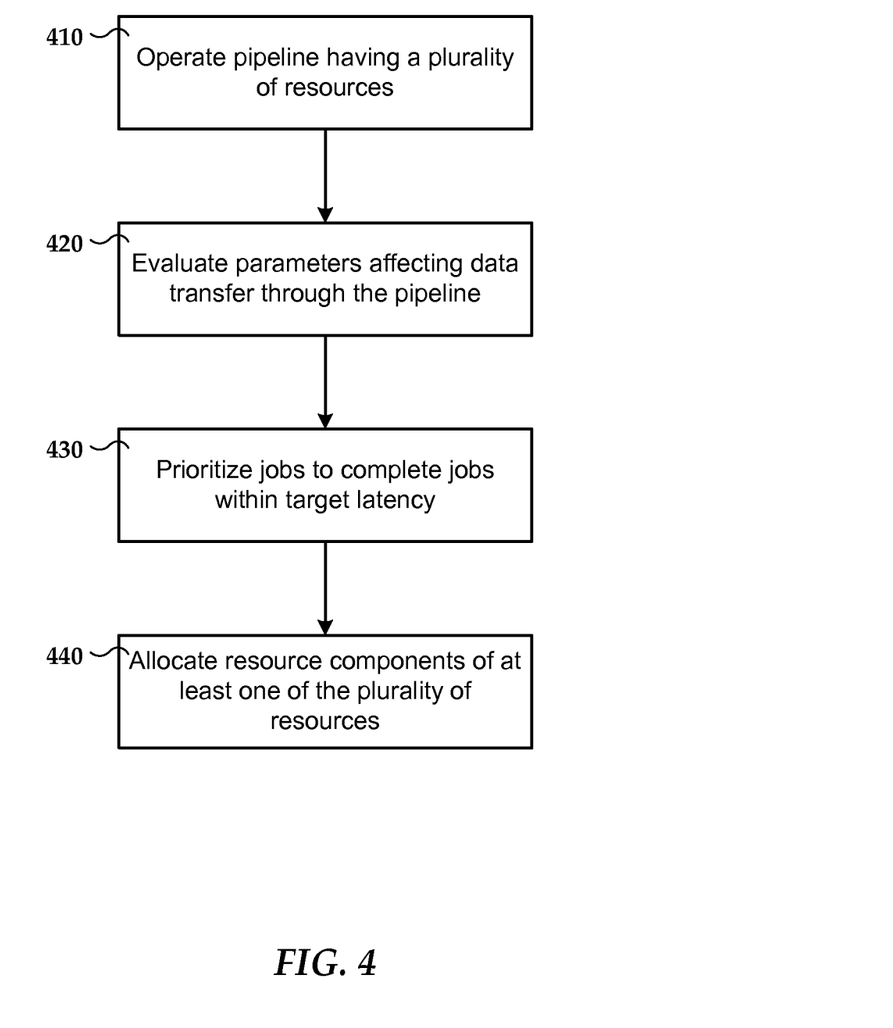
FIG. 4 is a flow diagram of a method of operating a load adaptive pipeline system in accordance some embodiments.

Processes involved in implementing a load adaptive pipeline system in accordance with some embodiments are illustrated by the flow diagram of FIG. 4. For example, the load adaptive pipeline system depicted in FIG. 3 can be arranged to implement the processes of FIG. 4. The pipeline includes a plurality of resources that are operated 410 in series. One or more of the resources have multiple resource components that are available to be activated or deactivated. When a resource component is activated, it operates in parallel with other resource components of the resource, thereby increasing the throughput of the pipeline for that stage.

The pipeline resource components can be activated or deactivated based at least in part on an evaluation 420 of parameters that affect data transfer through the pipeline. The parameters evaluated may include an estimated data transfer time and pipeline stage transfer time. The estimated data transfer time may be based on various factors including decode time, bit error rate, code rate, and storage device conditions. For non-volatile memory such as floating gate (flash) memory, the storage device conditions can include, number of program/erase cycles experienced by the flash memory, the retention time of the data and/or environmental conditions such as temperature, humidity and/or other factors. The estimated data transfer time is determined at least in part using a quality hint associated with the job to be transferred through the pipeline.

The pipeline stage transfer time is the current transfer time for jobs that are traversing through the pipeline. Pipeline stage transfer time is the sum of the transfer times for each stage in the pipeline ahead of the current job. The pipeline stage transfer time is the amount of time it will take to get a sub job through the system. To predict the amount of time it will take to get a sub job through the system, both where the sub job is in the system and the backlog that is ahead of it need to be taken into account. The estimated data transfer time and the pipeline stage transfer time are used to determine the total estimated latency for a job. The pipeline stage transfer time is sum of time between the current sub-job's position in the pipeline and the output of the pipeline to the input device.

The sub jobs to be transferred through the pipeline are prioritized 430 based on the estimated data transfer time, the pipeline stage transfer time, and the target latency associated with the job. Resource components of at least one of the resources in the pipeline are allocated 440 based on the total estimated latency and the target latency.

Figure 5:
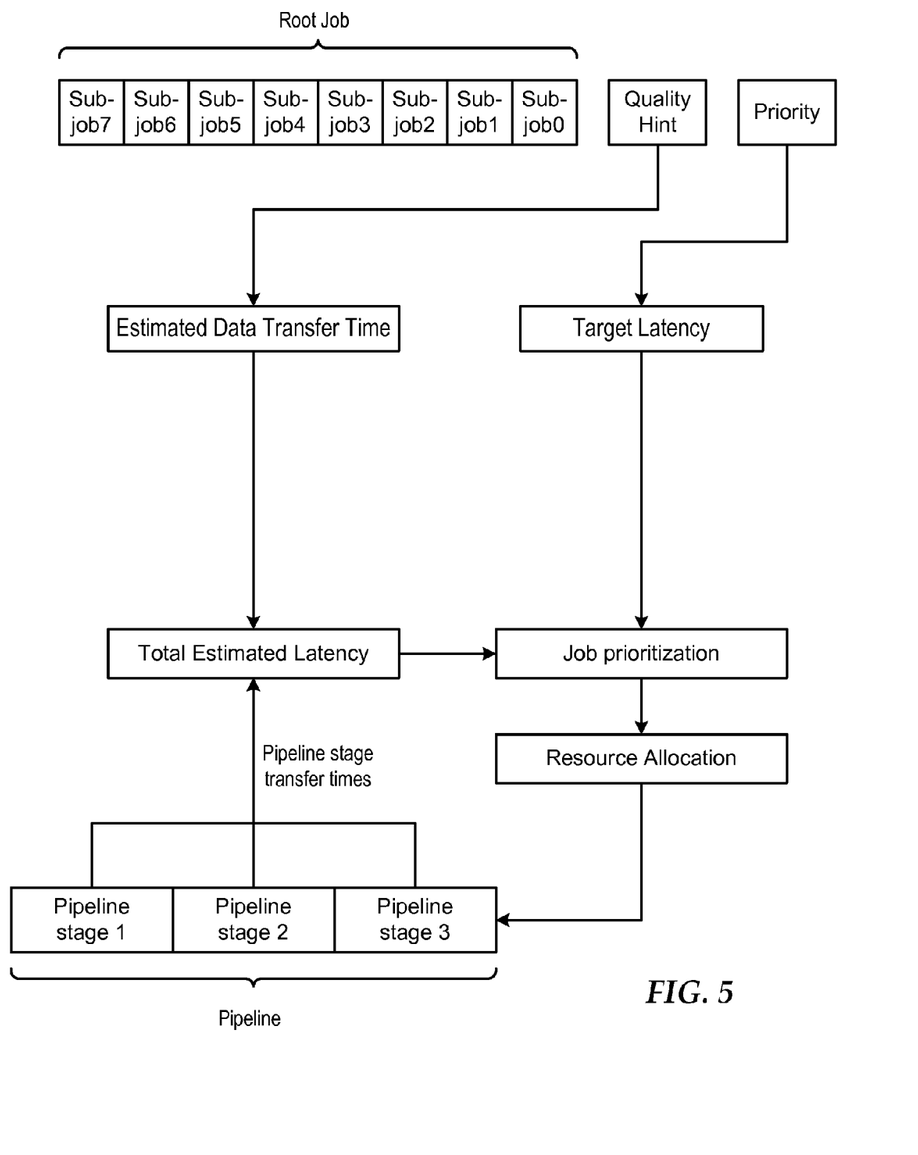
FIGS. 5 and 6 illustrate processes that can be implemented by the system of FIG. 3.
Figure 6:
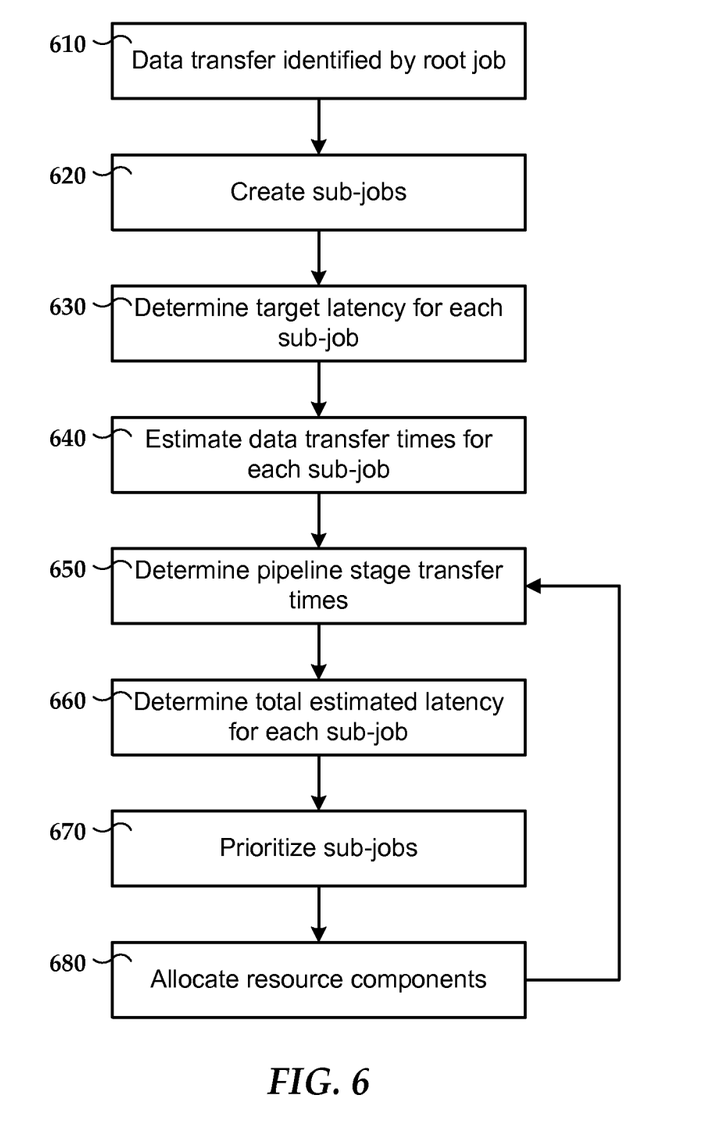

The processes involved in implementing a load adaptive pipeline as illustrated in FIG. 3 may be further understood in view of the process flow diagrams of FIGS. 5 and 6. Data to be transferred through the pipeline are identified 610 by a root job. The root job is associated with a quality hint and a priority for the root job. The pipeline controller organizes 620 the root job by creating a number of sub-jobs, e.g., sub jobs 0-7 as illustrated in FIG. 5.

The pipeline controller determines 630 a target latency for each sub-job. For example, the target latency can be determined based on the priority value passed to the memory controller by the host. In some implementations, the pipeline controller looks up the target latency from a look up table using the priority value.

The data transfer time for each sub job is estimated 640. The estimated data transfer time for each sub job may be determined by using the quality hint of the root job to form an index for an estimated data transfer time look up table (LUT).

The pipeline stage transfer time for the each sub job is determined 650 by summing the transfer times of each pipeline stage. Using the estimated data transfer time and the pipeline stage transfer time, the total estimated latency of each sub job is determined 660.

The sub jobs being transferred through the pipeline are prioritized 670 based on the total estimated latencies and target latencies for the sub-jobs. Sub jobs are transferred through the pipeline in the order of the prioritized list. Resource components are allocated 680 to achieve the target latency for each sub-job.

The pipeline controller continually evaluates the pipeline stage transfer times to account for changing conditions of the pipeline, incoming workload, and backlog. As sub-jobs completed they are removed from the backlog. As new root jobs enter the pipeline system, they add to the backlog.

Based on the pipeline transfer times, the pipeline controller updates the total estimated latency for each sub job in the prioritized list. The sub jobs in the prioritized list are reprioritized and the resource component allocations are updated.

Figure 7:
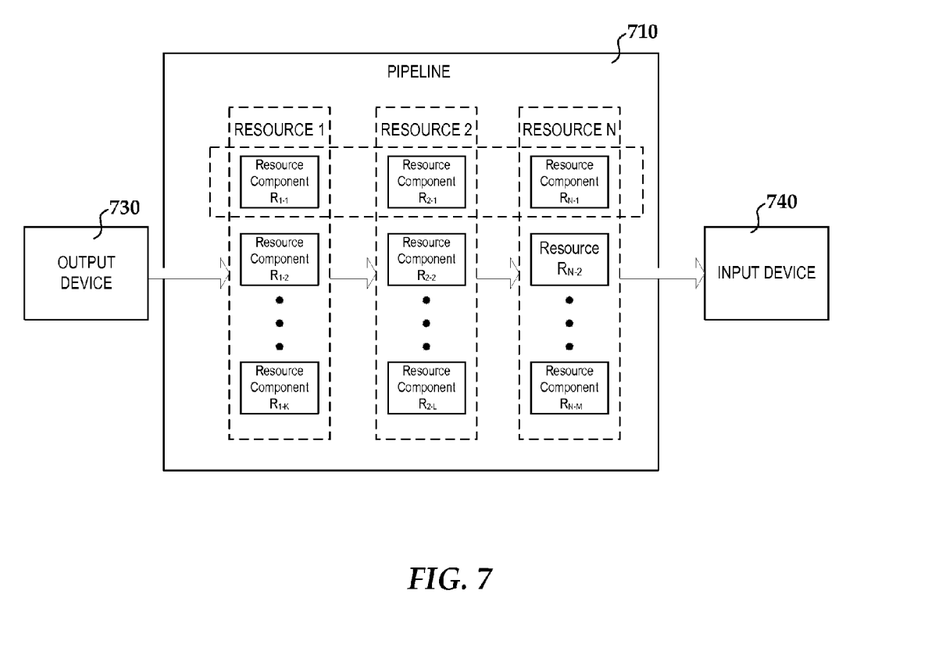
FIG. 7 is a block diagram of a flexible pipeline system that can be used for two types of data transfers between memory and a host, the two types of data transfers including normal data transfers and special data transfers.

In some embodiments, a pipeline may support both normal data transfer jobs as well as alternative data processes that may or may not be related to the normal data stream. For example, the alternative data processes involve "out of band operations" that can involve processes such as checking the health of the memory by reading specific memory areas and/or performing other data operations are not part of the data stream to the host. FIG. 7 illustrates a pipeline data communications channel 710 disposed between an output device 730, e.g. a data storage device, and an input device 740. The pipeline 710 illustrated in FIG. 7 uses non-fixed, flexible groups of resource components for one or more pipeline stages. Using a flexible pipeline channel, resource components can be allocated for special data transfer jobs without stopping normal data transfer operations.

As illustrated in FIG. 7, a flexible pipeline 710 may be implemented by allocating, for special data transfer jobs, one or more resource components for one or more of the pipeline resources (Resources 1, 2, . . . N). Because the remaining resource components are allocated for any normal data transfer operation, the performance of the pipeline for normal data transfers is minimally affected by the special data transfers.

In the example illustrated by FIG. 7, the special data transfer jobs are transferred through the pipeline 710 using resource components $R_{1-1}$, $R_{2-1}$, $R_{3-1}$ and the normal data transfer jobs are transferred through the pipeline using resource components $R_{1-2}$ . . . $R_{1-K}$, $R_{2-2}$ . . . $R_{2-L}$, $R_{3-2}$ . . . $R_{3-M}$. In this implementation, resource components $R_{1-1}$, $R_{2-1}$, $R_{3-1}$ used for the special data transfer operations are removed from the pool of available resource components used for normal data transfer operations until the special data transfer operations are completed. After completion of the special data transfer operations, the resource components $R_{1-1}$, $R_{2-1}$, $R_{3-1}$ are returned to the pool of resource components available for normal data transfer operations. In some configurations, one or more resource components of a single resource, or less than all resources may be allocated for the special data transfer jobs. For example, in some implementations, one or more decoder components of a decoder resource may be allocated for the special data transfer jobs and the resource components of other resources, e.g., input and output buffer resources are shared between the normal data transfer jobs and the special data transfer jobs.

In some embodiments, the special data transfers may be implemented using the same pool of resource components as normal data transfers, but the special data transfers are issued as lower priority jobs than normal data transfers. In these embodiments, the special data transfers only used the resources, e.g. input buffer resource, stage buffer resource, decoder resource, output buffer resource, when the normal data transfers do not need to use these resources. Thus, a single resource (or multiple resources) is not consumed by the special transfer operations and the performance for normal data transfer operations is minimally affected by the special data transfer operations.

Figure 8:
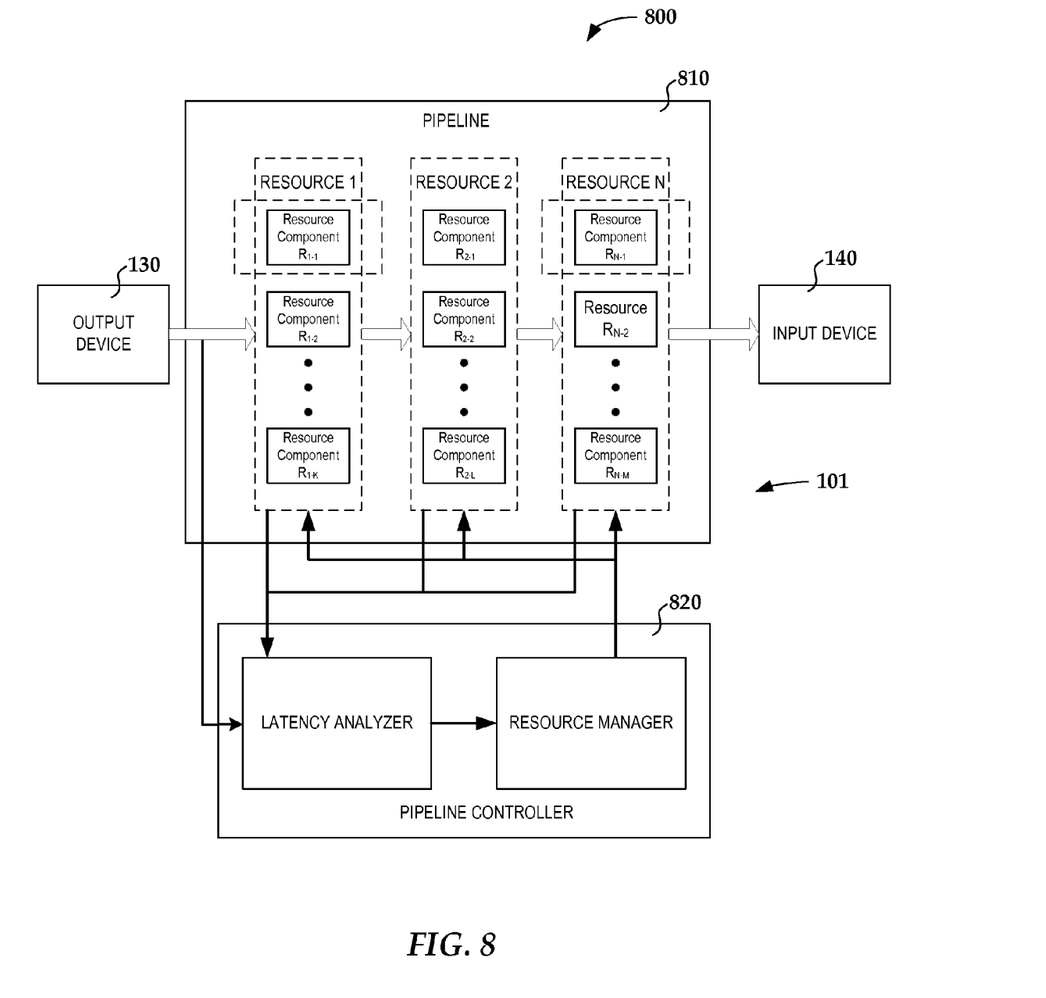
FIG. 8 is a block diagram of a load adaptive pipeline system that can be configured to implement normal data transfers and special data transfers between a memory and host.

In some embodiments, a load adaptive pipeline may be used for both normal data transfer operations and special data transfer operations. A load adaptive pipeline system 800 configured to handle both normal and special data transfers is illustrated in FIG. 8. As previously discussed, a load adaptive pipeline system, as illustrated in FIG. 8, can be designed to allocate pipeline resources according to an estimated latency through the pipeline and a target latency for both the normal data transfer and the special data transfers. The allocation of pipeline resource components to normal and special data transfer jobs may be performed on the fly to enhance data transfer performance while reducing power consumption. As previously discussed, the pipeline 810 is controlled by a load adaptive pipeline controller 820 that uses quality of data information, data transfer rates of the pipeline, and priority information to allocate pipeline resource components. Unused resource components maybe be deactivated or placed into a reduced power mode to save power.

FIG. 8 is a block diagram of a system 800 that includes a load adaptive pipeline 801 comprising a data transfer pipeline 810 and a load adaptive pipeline controller 820, The pipeline 810 is disposed between an output device 830 and an input device 840 to facilitate both normal data transfers and special data transfers therebetween. The pipeline 810 includes a number of stages, each stage associated with a particular pipeline resource, shown in FIG. 8 as resources 1, 2, . . . N. In this example, pipeline resources 1, 2, . . . N are coupled in series to transfer the data through the pipeline from the output device 830 to the input device 840. The resources 1, 2, . . . N can include data input buffers, data output buffers, decoders, encoders, for example.

One or more of the resources of the pipeline, e.g., resources 1, 2, . . . N includes a number of resource components that are arranged to operate in parallel. As depicted in the block diagram of FIG. 8, resource 1 comprises resource components $R_{1-1}$, $R_{1-2}$ . . . $R_{1-K}$; resource component 2 comprises components $R_{2-1}$, $R_{2-2}$ . . . $R_{2-L}$, resource component 3 comprises resource components $R_{3-1}$, $R_{3-2}$ . . . $R_{3-M}$. In an embodiment, resource 1 is an input buffer resource comprising K input buffers, resource component 2 is a decoder resource comprising L decoders, and resource N=3 is a output buffer resource comprising M output buffers.

The pipeline controller 820 is configured to allocate the resource components for the normal and special data transfers using quality of data information, data transfer rates of the pipeline, and priority information. One or more of the resource components may be active for each resource 1, 2, . . . N in the pipeline, depending on the allocation by the pipeline controller. The pipeline controller may enable or disable resource components of each resource to achieve a specified data transfer rate. Disabled resource components can be deactivated or placed into a reduced power mode to conserve power.

As depicted in FIG. 8, the pipeline controller 820 includes a latency analyzer and resource manager. The latency analyzer is configured to determine a total estimated latency from an estimated data transfer time for the data and a current data transfer time of the pipeline or pipeline stages. The estimated data transfer time of the data may be based on data quality factors (such as decode time, bit error rate, code rate, and storage device health, etc.) and also the pending workload at each pipeline stage, for example. The data transfer time of each stage of the pipeline is the time it takes data to transfer through that stage. The total data transfer time of the pipeline is the total of the data transfer times of each pipeline stage.

The resource manager can include a resource allocation controller for each resource in the pipeline. The resource allocation controllers are configured to allocate resource components to achieve a specified data rate based on the total estimated latency. The resource manager may activate or deactivate, enable or disable resource components for one or more resource types. In some implementations, resource components may be placed in various levels of power state, e.g., ready state, light sleep state, deep sleep state, and shut down state. The power state of the resources is based on the current loading of the pipeline resource and the backlog of jobs to be performed by the pipeline. The resource manager maintains a priority sorted list of jobs to be performed by each of the pipeline resources and issues commands to the pipeline stages to perform the jobs.

In some mixed implementations some resource components may be assigned to the special data transfers and other resource components may be adaptively allocated between special and normal data transfers. In FIG. 8, resource components R1-1 and RN-1 are assigned to the special data transfers and resources components R1-2 ... R1-K, R2-1 ... R2-L, R3-3 ... R3-M are assigned to normal data transfers. In this scenario, the load adaptive pipeline controller allocates resource components of Resource 2, e.g., a decoder, for both special and normal data transfers.

Embodiments disclosed herein relate to a data recovery pipeline configured to transfer data between a memory and a host processor. The memory may include for example, a magnetic storage medium, a solid state non-volatile memory, or a hybrid memory comprising a two types of memory, e.g., a magnetic storage medium and a non-volatile solid state memory.

The pipeline includes a plurality of resources that are used to carry on the data recovery operations of the pipeline. For example, in various pipeline configurations, the resources may comprise an input buffer resource, a decoder resource, a encoder resource, an output buffer resource and/or other resources that are used in the data recovery process. One or more of the plurality of resources in the pipeline has multiple resource components available for allocation. For example, an input buffer resource can include multiple input buffers available for allocation; a decoder resource can have multiple decoders available for allocation; an output buffer resource can have multiple output buffers available for allocation. The resource components allocated to each of the one or more resources can be arranged to operate in parallel so that when multiple resources components of the same type are activated, they operate together to increase the throughput of the pipeline.

A resource component can be allocated, meaning that it is activated or a resources component can be non-allocated. Non-allocated resource components operate in a reduced power mode to conserve energy. For example, non-allocated resource components can be placed into light sleep, deep sleep, or can be deactivated (shut down).

A pipeline controller is configured to assess at least one parameter affecting data transfer through the pipeline and allocate the resource components to the one or more resources in the pipeline in response to assessment of the at least one data transfer parameter. The at least one parameter affecting data transfer may include one or more of quality of data, decode time, bit error rate, code rate, memory age, and pending workload.

The data is transferred to the pipeline via a root job that includes multiple code words. The pipeline controller creates a number of sub job for the root job, each sub job includes a subset of one or more code words of data of the root job. The root job also passes a quality hint and priority associated with the data to the pipeline controller. The pipeline controller is configured to use the quality hint to determine an estimated data transfer time for each sub-job. For example, the pipeline controller may use a programmable look up table to determine the estimated data transfer time for each sub job based on the quality hint. The pipeline controller is configured to determine a pipeline stage transfer time for each pipeline stage and to determine a total estimated latency for the sub job based on the estimated data transfer time and a sum of the pipeline stage transfer times.

The root job passes a priority to the pipeline manager which is used to determine a target latency for each sub-job. The pipeline controller can include a target latency determined by using the priority to look up the target latency in a programmable look-up table. The pipeline controller can be configured to allocate resource components based on a total estimated latency and a target latency of each sub-job.

In some implementations, the pipeline controller is configured to allocate the resource components by enabling or disabling the resource components on the fly.

Some embodiments relate to a method of operating a memory controller. The method includes operating a data communications pipeline that transfers data between a memory and a host processor. The pipeline comprises a plurality of resources coupled in series between a host processor interface and a memory interface. At least one parameter affecting data transfer through the pipeline is assessed. Pipeline resource components for at least one of the plurality of resources in the pipeline are allocated in response to assessment of the data transfer parameter. The plurality of resources can include a decoder resource, an encoder resource, an input buffer resource, an output buffer resource, for example. Assessing the at least one data transfer parameter can involve estimating data transfer latency through the pipeline. For example, assessing the at least one data transfer parameter can involve assessing a pipeline stage data transfer rate for each pipeline stage. Allocating the resource components can be accomplished by activating or deactivating one or more of the resource components.

Data is transferred into the pipeline as a root job and a sub job is created for each subset of one or more code words in the data of the root job. In some implementations, a quality hint and a priority are associated with each root job. The quality hint and priority apply to the sub jobs of the root job. The estimated data transfer time is determined based on the quality hint. e.g., by looking up the estimated data transfer time in a look up table. The target latency for the root job is determined from the priority value, e.g., by looking up the target latency in a look up table.

The pipeline state transfer time is determined at each stage of the pipeline. A total estimated latency for the sub job is based on the estimated data transfer time and the pipeline stage transfer times. The available resource components are allocated based on the total estimated latency and the target latency.

In some embodiments, all or part of the load adaptive pipeline system may be implemented in hardware. In some embodiments, the pipeline and/or pipeline manager may be implemented in firmware, software running on a microcontroller or other device, or any combination of hardware, software and firmware. The techniques described in this disclosure may be implemented, at least in part, in hardware, software, firmware or any combination thereof. For example, various aspects of the described techniques may be implemented within one or more controllers, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "controller," "processor," or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a non-transitory computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A system comprising:
  a memory;
  a data recovery pipeline configured to transfer data between the memory and a host processor, the data associated with a root job, the pipeline comprising a plurality of resources, one or more of the plurality of resources in the pipeline having multiple resource components available for allocation; and
  a pipeline controller configured to:
    create a sub-job for each subset of one or more code words in the data associated with the root job;
    estimate a data transfer time for each sub-job;
    determine a pipeline stage transfer time for each pipeline stage;
    determine a total estimated latency for the sub-job based on the estimated data transfer time and a sum of the pipeline stage transfer times;
    assess at least one parameter affecting data transfer through the pipeline; and
    allocate resource components to the one or more resources in the pipeline in response to assessment of the at least one data transfer parameter and the total estimated latency for the sub-job.

2. The system of claim 1, wherein the at least one parameter comprises one or more of quality of data, decode time, bit error rate, code rate, memory age, and pending workload.

3. The system of claim 1, wherein the pipeline controller is configured to cause non-allocated resource components to operate in a reduced power mode.

4. The system of claim 1, wherein:
  a quality hint is associated with each root job; and
  the pipeline controller is configured to use the quality hint to estimate the data transfer time for each sub-job.

5. The system of claim 4, wherein:
  the pipeline controller comprises a look up table of estimated data transfer times; and
  the pipeline controller is configured to use the quality hint to look up an estimated data transfer time for each sub job from the look up table.

6. The system of claim 1, wherein:
  a priority value is associated with each root job; and
  the pipeline controller is configured to use the priority value to determine a target latency for the sub job.

7. The system of claim 1, wherein:
  the pipeline controller includes a look up table of target latencies for each root job; and
  the pipeline controller is configured to look up a target latency value for the sub job from the look up table using the priority value.

8. The system of claim 1, wherein the pipeline controller is configured to allocate resource components based on a target latency of each sub-job.

9. The system of claim 1, wherein the pipeline controller is configured to allocate the resource components by enabling or disabling the resource components on the fly.

10. A system comprising:
  a memory;
  a data recovery pipeline configured to execute data transfers between the memory and a host processor, the data associated with a root job, the data transfers including normal data transfers between a memory and a host processor and special data transfers, the pipeline comprising a plurality of resources arranged in series, one or more of the plurality of resources in the pipeline having multiple resource components available for allocation; and
  a pipeline controller configured to:
    create a sub-job for each subset of one or more code words in the data associated with the root job;
    estimate a data transfer time for each sub-job;

determine a pipeline stage transfer time for each pipeline stage;

determine a total estimated latency for the sub-job based on the estimated data transfer time and a sum of the pipeline stage transfer times;

assess at least one parameter affecting data transfer through the pipeline; and allocate resource components to the one or more resources in the pipeline in response to assessment of the data transfer parameter and the total estimated latency for the sub-job.

11. The system of claim 10, wherein the pipeline controller is configured to allocate a first set of the resource components to implement the normal data transfers and to allocate a second set of the resource components to implement the special data transfers.

12. The system of claim 10, wherein the pipeline controller is configured to allocate the resource components in the first set by enabling or disabling the resource components in the first set based on a total estimated latency and a target latency of the normal data transfers.

13. The system of claim 10, wherein the pipeline controller is configured to allocate the resource components in the second set by enabling or disabling the resource components in the second set based on a total estimated latency and a target latency of the special data transfers.

14. The system of claim 10, wherein:

the pipeline controller is configured to allocate the resource components based at least in part on data transfer priority; and the special data transfers are assigned a lower priority than the normal data transfers.

15. A method performed by a processor for operating a memory controller, comprising:

operating a data communications pipeline that transfers data between a memory and a host processor, the pipeline comprising a plurality of resources coupled in series between a host processor interface and a memory interface, one or more of the resources having multiple resource components available for allocation;

transferring data into the pipeline using a root job;

creating a sub-job for each subset of one or more code words in the data associated with the root job;

estimating a data transfer time for each sub-job;

determining a pipeline stage transfer time for each pipeline stage;

determining a total estimated latency for the sub-job based on the estimated data transfer time and a sum of the pipeline stage transfer times;

assessing at least one parameter affecting data transfer through the pipeline; and allocating resource components used for the one or more resources in response to assessment of the data transfer parameter and the total estimated latency.

16. The method of claim 15, wherein the root job is associated with a quality hint and a priority and operating the pipeline comprises:

determining an estimated data transfer time based on the quality hint;

determining a target latency based on the priority.

17. The method of claim 16, further comprising allocating the available resource components based on the target latency.

18. The method of claim 15, wherein:

the data transfers include normal data transfers between a memory and a host processor and special data transfers; and allocating the resource components comprises at least one of allocating a first set of the resource components to the normal data transfers and allocating a second set of the resource components to the special data transfers.

* * * * *